(12) United States Patent
Lockleer

(10) Patent No.: US 12,741,432 B1
(45) Date of Patent: Sep. 22, 2026

(54) AUTOCLAVE CURING JIG

(71) Applicant: Amazon Technologies, Inc., Seattle, WA (US)

(72) Inventor: John Lockleer, Everett, WA (US)

(73) Assignee: Amazon Technologies, Inc., Seattle, WA (US)

( * ) Notice: Subject to any disclaimer, the term of this patent is extended or adjusted under 35 U.S.C. 154(b) by 38 days.

(21) Appl. No.: 18/753,328

(22) Filed: Jun. 25, 2024

(51) Int. Cl.
*B29C 70/54* (2006.01)
*B29C 70/44* (2006.01)
*B29L 31/30* (2006.01)

(52) U.S. Cl.
CPC ............ *B29C 70/549* (2021.05); *B29C 70/44* (2013.01); *B29L 2031/3076* (2013.01)

(58) Field of Classification Search
CPC ................... B29C 70/549; B29C 70/44; B29L 2031/3076
See application file for complete search history.

(56) References Cited

U.S. PATENT DOCUMENTS 2,052,343 A * 8/1936 Du Bois ................. C03B 11/02 65/159
10,999,052 B1 * 5/2021 Margraf, Jr. .......... B29C 43/203
11,813,812 B1 * 11/2023 Weaver ................... B29C 55/04
2010/0139857 A1 * 6/2010 Pham ................... B29C 33/505 425/389
2011/0006460 A1 * 1/2011 Vander Wel ............ B30B 15/34 264/403
2020/0078990 A1 * 3/2020 Sana ..................... B29C 33/485
2022/0332060 A1 * 10/2022 Kendall .................. B29C 43/56
2023/0398751 A1 * 12/2023 Tokutomi ............. B29C 70/443

* cited by examiner

*Primary Examiner* — Michael N Orlando
*Assistant Examiner* — Abhishek A Patwardhan
(74) *Attorney, Agent, or Firm* — Athorus, PLLC

(57) ABSTRACT

Described are apparatuses, assemblies, and processes to create a carbon fiber part with a smooth convex surface using an interior mold. An uncured part may be formed by wrapping fiber and resin around a mandrel (interior mold). One or more caul plate and optional shims may be placed over the uncured part in alignment with features that correspond between the caul plate(s) and the mandrel. The assembly may be enclosed in a vacuum bag and consolidated. The assembly may be placed on a jig base. A compression member may be coupled to the jig base to contain the assembly therebetween. The compression member may exert a force onto the caul plate to compress the uncured part against the mandrel during a curing process, thereby creating a smooth surface finish of the resulting cured part that is free from substantial undesirable warping or wrinkles about the surface.

20 Claims, 8 Drawing Sheets

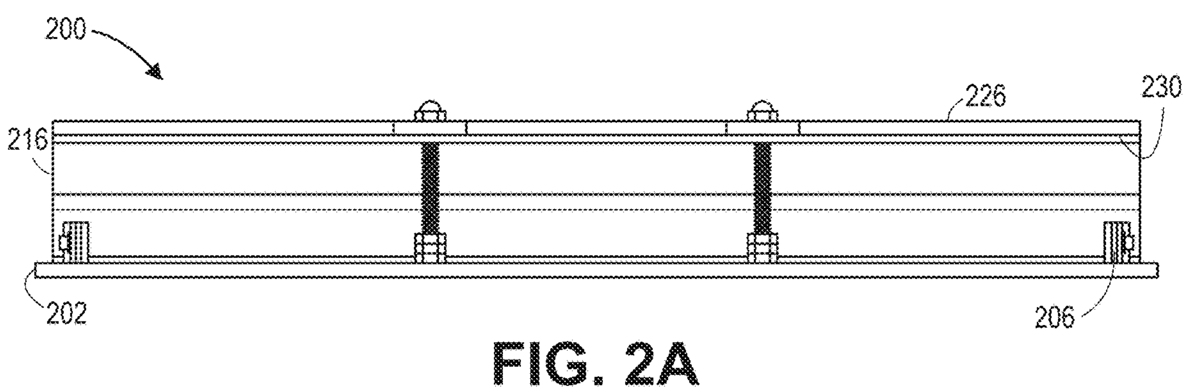
FIG. 2A
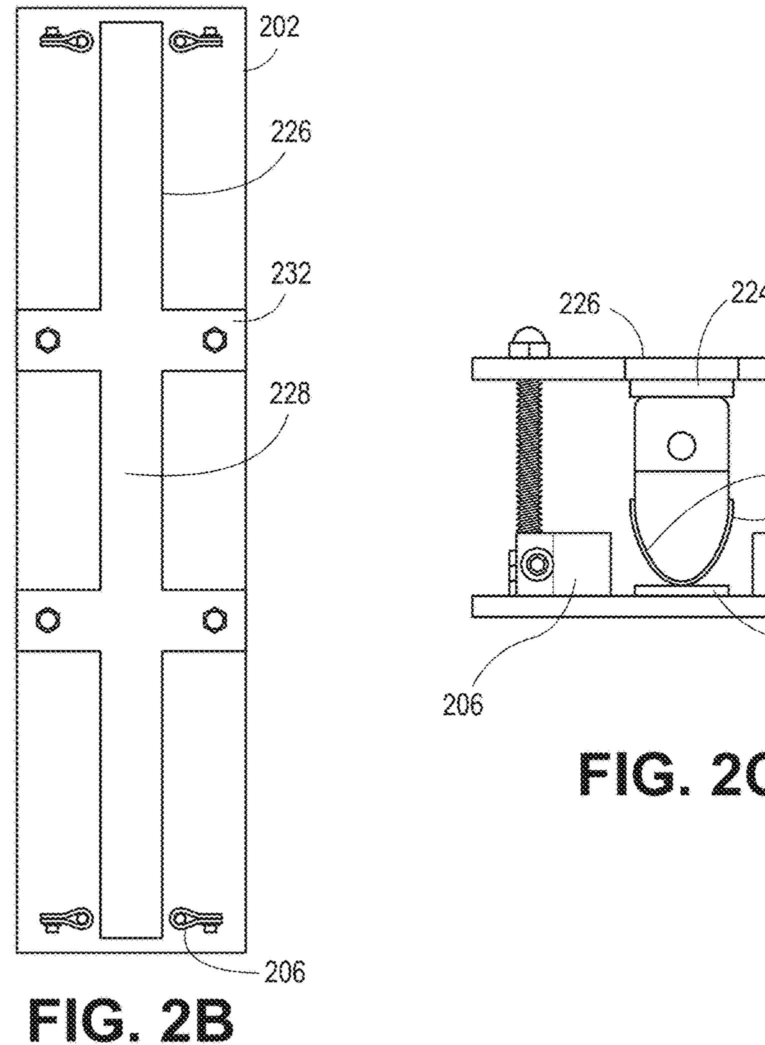
FIG. 2B
FIG. 2C 310
306(2)
220
302
306(3)
212
234
316
202
318
226
224
206
204
216

AUTOCLAVE CURING JIG

BACKGROUND

Creating carbon fiber parts in low volume production can be time consuming and costly. Initial considerations may include how to best create a jig for forming a hollow part. Often, there are two different approaches, each having different benefits and costs. A first approach is to form a split exterior mold that acts as an outer shell for the part to be cured. In this approach, an internal vacuum bag is inserted into a hollow cavity of the split exterior mold that holds the prepreg of the part. The internal vacuum bag is then consolidated with an outer bag to surround the part in preparation for curing the part. The internal vacuum bag applies even pressure to the part to compress the part during a curing process into the split exterior mold. One benefit of this approach is the exterior layer of the finished part typically conforms with the surface of the split exterior mold, resulting in a predictable surface finish. One downside of this approach is the cost and complexity of creating the split exterior mold.

A second approach is to wrap prepreg around an interior mold, sometimes called a mandrel. In this approach, the prepared part can be inserted into a vacuum bag. The vacuum bag is then consolidated to press the outer layer of the part toward the interior mold during the curing process. One benefit of this approach is the simplicity of the interior mold, which may result in cost savings and preparation time. One downside of this approach is that it is difficult to create a very smooth finish on the exterior part when using an internal mold.

Creation of certain parts may require a smooth outer surface subject to a high tolerance threshold while being created in low production. These parts may be created at a lower expense using the second approach and wrapping an interior mold with prepreg if an acceptable exterior surface can be formed without extra rework or compromising the strength of the finished part.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

FIG. 2A is a side elevation view of an illustrative jig assembly to create a hollow carbon fiber part, according to an implementation.

FIG. 2B is a top view of the illustrative jig assembly shown in FIG. 2A.

FIG. 2C is an end elevation view of the illustrative jig assembly shown in FIG. 2A.

Figure 1:
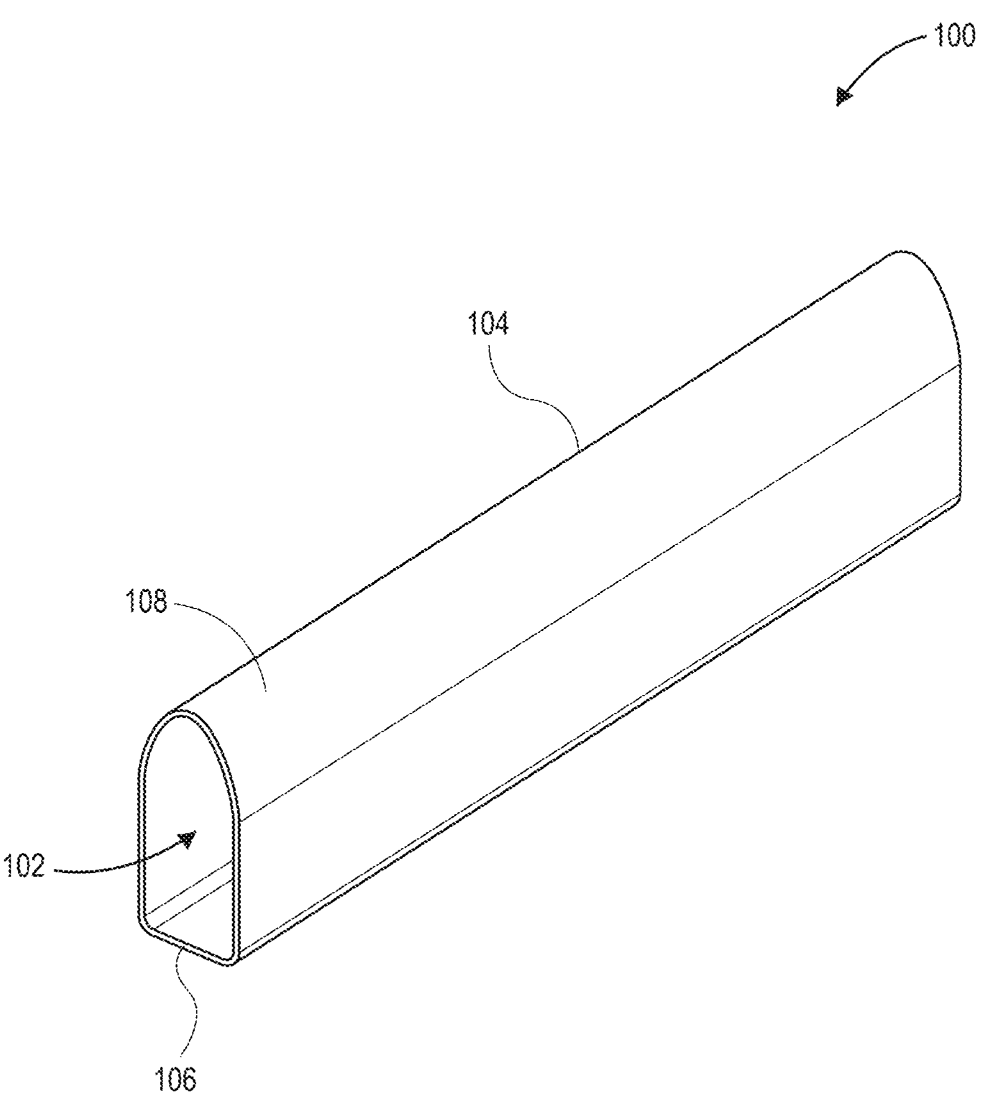
FIG. 1 is a perspective view of a hollow carbon fiber part known in the prior art.

While implementations are described herein by way of example, those skilled in the art will recognize that the implementations are not limited to the examples or drawings described. It should be understood that the drawings and detailed description thereto are not intended to limit implementations to the particular form disclosed but, on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word “may” is used in a permissive sense (i.e., meaning having the potential to), rather than the mandatory sense (i.e., meaning must). Similarly, the words “include,” “including,” and “includes” mean including, but not limited to.

DETAILED DESCRIPTION

Apparatuses, assemblies, and methods disclosed herein enable creation of carbon fiber parts with smooth surface finishes that comply with surface tolerance and structural requirements and can be created in low production with an interior mold, referred to herein as a “mandrel.” By using a mandrel, cost savings can be achieved by avoiding creation of a complex split exterior mold. An illustrative jig may be used to secure the part during curing and may apply additional force to portions of the prepreg during curing in addition to forces generated by the vacuum bag against the prepreg.

A part to be created may include a convex surface, such as to form a leading edge of a strut. In certain environmental uses, the surface finish of the strut may require a smooth finish with little or no detectable warping or wrinkling on the surface. For example, a smooth finish may be important in a design for aerodynamic or hydrodynamic considerations, such as when the part is subject to moving air or water. Other shapes with convex surfaces or other similar profiles may also benefit from the techniques and apparatuses disclosed herein that limit or prevent warping and/or wrinkling of prepreg during the curing process due to lateral pressure caused by the vacuum bag in the regions of the part having the convex features or other complex features.

To create a part, such as a strut with a convex surface, prepreg may be wrapped around the mandrel having a complementary shape as the final part to be formed using this process. The mandrel may be a split mandrel, including two sections coupled together along a plane parallel to an axis angled slightly from the longitudinal axis of the mandrel, to ease removal of the mandrel from a cured part. To create a smooth finish on the convex surface, a caul plate may be added over at least a portion of the convex surface after the mandrel is wrapped in the prepreg. The caul plate may be formed of carbon fiber or another hard material and may create a smooth finish on the cured part when the caul plate is pressed against the part during the curing. In some embodiments, additional caul plates may be used for other portions of the part. Shims or other spaces may be used to fill voids between the caul plates.

The prepreg wrapped around the mandrel along with the caul plate(s) and any shims may be inserted into a vacuum bag to form a curing assembly. The vacuum bag is then consolidated to press the caul plate(s) and shim(s) toward the outer layer of the part (e.g., prepreg, etc.) and toward the mandrel during the curing process, effectively compressing the part between the mandrel and caul plate or the mandrel and shim. The curing assembly may be inserted into a jig base and oriented such that the convex surface of the mandrel is facing either substantially toward the jig base or substantially away from the jig base. A compression member may be coupled to the jig base such that the curing assembly is contained therebetween. In some embodiments, the convex surface of the mandrel may be oriented to face toward the compression member. The compression member may be tightened to the jig base, thereby imparting an additional force on the caul plate and against the prepreg and mandrel to prevent undesirable surface warping or wrinkles from forming on the part during the curing process.

In some embodiments, the compression member may be coupled to the jig base using threaded bolts and a nut, such as a cap nut that may limit overtightening of the compression member. In various embodiments, the compression member may be coupled to the jig base by a lever that movably alternates between a first position configured to release the compression member and a second position configured to constrain the compression member, wherein the lever, when in the second position, imparts the force on the caul plate toward the part. In one or more embodiments, the compression member may be coupled to the jig base by biasing members that include a restraining feature to securely hold the compression member in place. The biasing members may deflect to allow the compression member to be inserted between the biasing members and toward the jig base until a surface of the compression member aligns with the restraining feature of the biasing members and the biasing members return to a less deflected shape to restrain the compression member in alignment with the restraining feature.

FIG. 1 is a perspective view of a hollow carbon fiber part 100 known in the prior art. The carbon fiber part 100 may be formed using a wet lay-up technique where fiber is cut and laid into a mold and resin is applied to the fiber. The carbon fiber part 100 may be formed using prepreg lamination (or "prepreg") where resin is infused in the fiber. The carbon fiber part 100 may be formed using resin transfer molding where resin is forced into a cavity at high pressure. The carbon fiber part 100 may be cured using an autoclave to create a cured rigid structure.

The carbon fiber part 100 may include an aperture 102, which may extend the length of a body 104 of the carbon fiber part 100, thereby creating a hollow part. The carbon fiber part 100 may include a thin wall structure 106, which may be formed of multiple layers of carbon fiber, such as multiple layers of prepreg. For example, three or more layers of prepreg may form the part where each layer overlaps a prior layer (e.g., overlap by approximately 3 mm or more, etc.).

The carbon fiber part 100 may include a convex surface 108 as part of an outer surface of the part. The convex surface 108 may extend along a longitudinal axis of the carbon fiber part 100. The convex surface 108 may create certain challenges during layup and curing to form the part using existing techniques, which may result in formation of an inconsistent surface of the carbon fiber part that includes detectable warping or wrinkling on the surface, surface deformation, or other unintended and undesirable features in the surface of the carbon fiber part 100. In some situations, the surface of the carbon fiber part may be specified to have a smooth outer surface subject to a high tolerance threshold but may be created in low production, which may determine a type of tooling used to create the carbon fiber part 100. As disclosed below, an exemplary jig is described to enable consistent production of the carbon fiber part 100 with a smooth exterior surface free from undesirable warping or wrinkling on the surface, surface deformation, or other unintended and undesirable features in the surface of the carbon fiber part. The exemplary jig may reduce expenses inherent in creating exterior split molds, which can be costly to create for low production part creation.

Figure 2D:
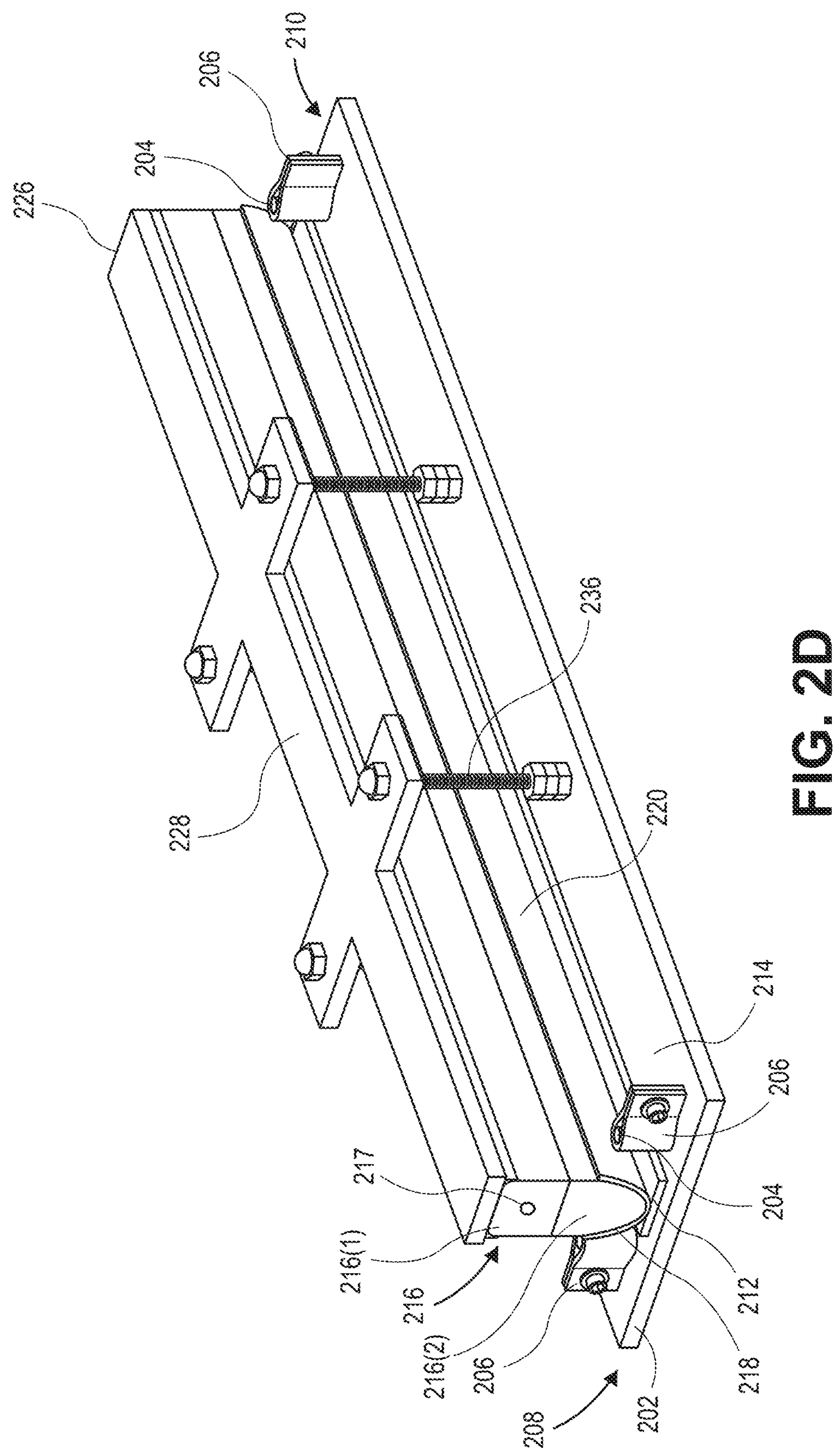
FIG. 2D is a perspective view of the illustrative jig assembly shown in FIG. 2A.

FIG. 2A is a side elevation view of an illustrative jig assembly 200 to create a hollow carbon fiber part, such as the carbon fiber part 100, according to an implementation. FIG. 2B is a top view of the illustrative jig assembly 200 shown in FIG. 2A. FIG. 2C is an end elevation view of the illustrative jig assembly 200 shown in FIG. 2A. FIG. 2D is a perspective view of the illustrative jig assembly 200 shown in FIG. 2A. The following description primarily references FIG. 2D, but reference numerals are used across all of the FIGS. 2A-2D.

FIG. 2D shows a jig base 202. The jig base 202 may be a substantially planar member formed of metal, such as steel. However, the jig base 202 may be formed of other materials capable of withstanding heat and pressure of an autoclave in excess of 400 degrees Fahrenheit. The jig base 202 may be shaped in a rectangular planar shape. In some embodiments, the jig base 202 may include guideposts 204. The guideposts may be formed of pins coupled to a same surface of the jig and located in pairs on either side of a longitudinal axis of the jig base. Insulators 206 may be coupled to the guideposts 204. The insulators may be formed of rubber, silicon, or other non-abrasive materials. The guideposts 204 and/or the insulators 206 may be used for alignment purposes when inserting certain parts described below onto or into the jig base 202. The guideposts 204 may be provided in pairs, such as a first pair on a fore end 208 of the jig base and a second pair on an aft end 210 of the jig base 202.

The assembly 200 may include a first pad 212. The first pad 212 may be coupled to the jig base 202 and may extend along a longitudinal axis. The first pad 212 may be formed of silicone or other suitable material capable of repeat use in an autoclave curing process. The first pad 212 may be a planar shape and rectangular in shape and have a width greater than a thickness. In some embodiments, a thickness of the first pad 212 may be between 0.5 mm and 2 mm depending on the application; however, other thicknesses of the first pad may be used. The width of the first pad 212 may be less than a distance between the guideposts 204 to enable the first pad 212 to lay flat against a top surface 214 of the jig base 202.

The assembly 200 may include a mandrel 216. The mandrel 216 may be a longitudinal shaft that is an interior mold for the carbon fiber part to be created using the assembly 200. The mandrel 216 may be a solid structure (i.e., not hollow). However, in some embodiments, a hollow mandrel may be used. The mandrel 216 may include multiple sections, such as a top section 216(1) and a bottom section 216(2), which may be coupled together, such as with a threaded bolt 217 that couples to threads in at least one of the parts of the mandrel 216. The division of the top section 216(1) and the bottom section 216(2) may be along a plane that is angled relative to a longitudinal axis of the mandrel to enable removal of one of the top section 216(1) or the bottom section 216(2) from a cured part without damaging or otherwise causing stress or strain to the cured part during removal of the mandrel 216.

The mandrel 216 may include a convex surface 218 that is used to create a convex surface on the cured part, such as the convex surface 108 on the carbon fiber part 100 shown in FIG. 1. The mandrel 216 may include one or more other convex surface and/or radius, such as on a side opposite of the convex surface 218.

The assembly 200 may include a caul plate 220. The caul plate 220 may be formed to have an interior concave surface 222 (shown in FIG. 2C) with a contour that is substantially complementary to the convex surface 218 of the mandrel 216. The caul plate 220 may be formed of a thin material (e.g., approximately 0.5 mm to 1.5 mm in thickness), such as carbon fiber or other suitable material capable of repeat use in an autoclave curing process. The caul plate 220 may substantially cover the convex surface 218 of the mandrel 216 but may not cover all of the convex surface. The caul plate 220 may have substantially the same length as the mandrel 216. In some embodiments, multiple caul plates may be used. For example, a second caul plate may be used proximate to a radius of the mandrel 216, such as on a side of the mandrel 216 opposite the convex surface 218. In some embodiments, shims may be used between caul plates or adjacent to a caul plate. Shims are described in more detail in reference to FIGS. 3A and 4, below.

The caul plate 220 may be used to create a smooth outer surface of a final cured part (not shown in FIG. 2D) subject to a high tolerance threshold and free from undesirable warping or wrinkling on the surface, surface deformation, or other unintended and undesirable features in the surface of the carbon fiber part. To achieve the intended smooth outer surface of the final cured part, the caul plate 220 may receive a force applied via at least the jig base 202 and transferred through the first pad 212, such that the caul plate 220 compresses prepreg located between the mandrel 216 and the caul plate 220 during a curing process of a part.

The assembly 200 may include a second pad 224, shown in FIG. 2C. The second pad 224 may be positioned above the mandrel 216 proximate to a surface of the mandrel 216 that is opposite the convex surface 218. The second pad 224 may have a length similar to the length of the mandrel 216 and may extend along a longitudinal axis of the mandrel 216. The second pad 224 may be formed of silicone or other suitable material capable of repeat use in an autoclave curing process. The second pad 224 may be rectangular in shape and have a width greater than the thickness of the second pad. In some embodiments, a thickness of the second pad 224 may be between 0.5 mm and 2 mm depending on the application; however, other thicknesses of the second pad may be used. The width of the second pad 224 may be less than the distance between the guideposts 204. In some embodiments, the second pad 224 may be similar to the first pad 212 in size, shape, and material.

The assembly 200 may include a compression member 226. The compression member 226 may be removably coupled to the jig base 202. The compression member 226 may be a substantially planar member formed of metal, such as steel. However, the compression member 226 may be formed of other materials capable of withstanding heat and pressure of an autoclave curing process. The compression member 226 may include a body 228. The body 228 may be substantially rectangular-shaped. The body 228 may include a structural rigidity to resist deflection and to impart a force toward the mandrel 216 when coupled to the jig base 202. The body 228 may extend a length similar to the length of the mandrel. A lower surface 230 (shown in FIG. 2A) of the body 228 may be situated facing the second pad 224. The second pad 224 may be coupled to the lower surface 230 of the body 228.

The compression member 226 may be used in conjunction with the jig base 202 to impart a force toward the mandrel 216 to cause the caul plate 220 and the mandrel 216 to compress prepreg or other material used to form the carbon fiber plate and situated between the mandrel 216 and the caul plate 220 during a curing process. The compression member 226 and the jig base 202 act as a clamp to impart the compression force via the mandrel 216 and the caul plate 220.

In some embodiments, the compression member 226 may include pairs of arms 232. The arms 232 may extend laterally from the body 228 of the compression member 226. In some embodiments, at least some of the arms 232 may include an aperture 234 (shown in FIG. 4) to receive a shaft 236 that extends from the jig base 202 through the aperture 234 to enable coupling the compression member 226 to the jig base. The shaft 236 may be used in part to align the compression member 226 with the jig base 202.

The assembly 200 may include coupling members 238. The coupling members may couple the compression member 226 to the jig base 202 such that the compression member 226 applies a known force toward the jig base, which is translated to a compression force via the caul plate 220 to compress a part to be formed between the caul plate 220 and the mandrel 216. Illustrative coupling members are described below with reference to FIGS. 3A, 3B, and 3C.

When the compression member 226 is coupled to the jig base 202, the assembly 200 may include the following layers listed as starting from the jig base 202 and progressing toward the compression member 226.

The jig base 202
The first pad 212
The caul plate 220
An uncured part (shown in FIGS. 3A-3C)
The mandrel 216
The second pad 224
The compression member 226

Figure 3A:
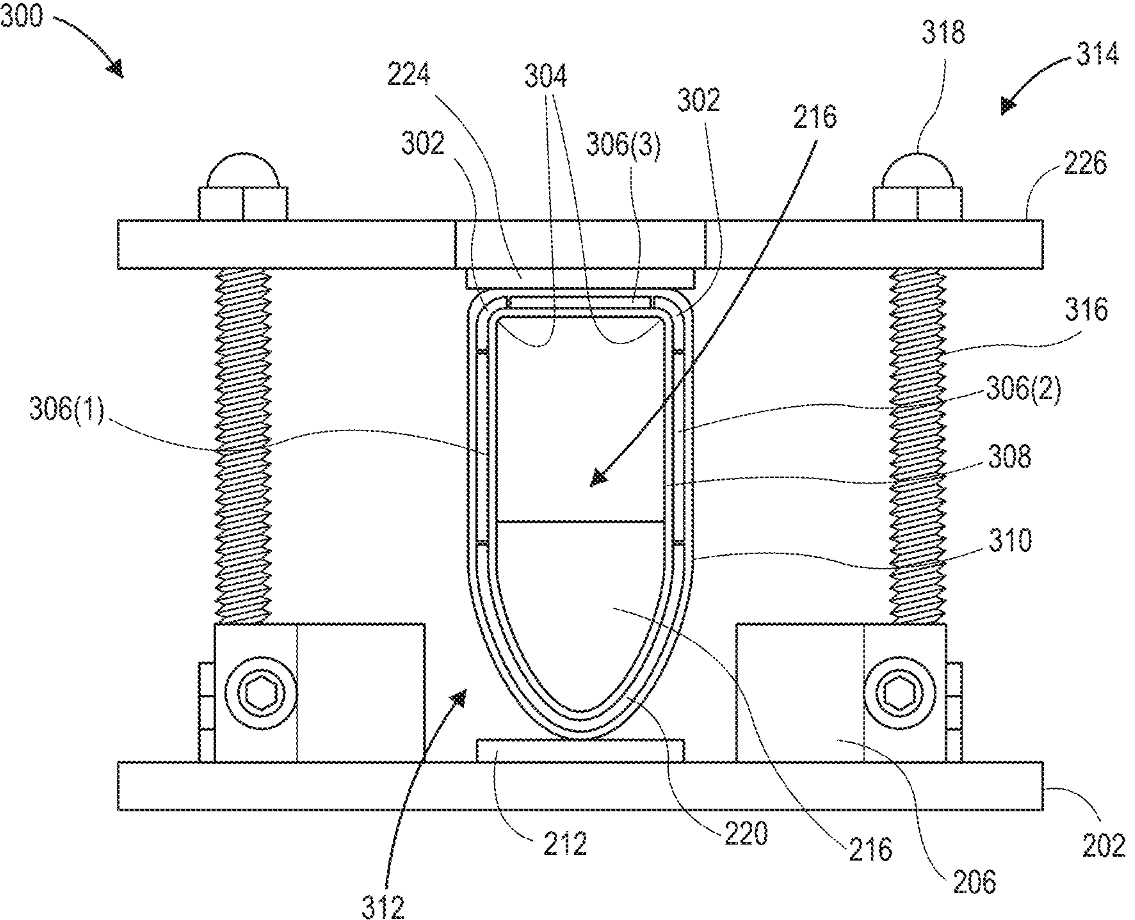
FIG. 3A is an end elevation view of the illustrative jig assembly shown in FIG. 2A and including exemplary caul plates with shims and a vacuum bag, according to an implementation.

FIG. 3A is an end elevation view of the illustrative jig assembly 300 that includes the components of the jig assembly 200 shown in FIG. 2A. The jig assembly 300 shown in FIG. 3A includes the caul plate 220 as well as secondary caul plates 302. The secondary caul plates 302 may correspond with radii 304 included in the mandrel 216. The secondary caul plates 302 may have a shape that is complementary to the radii 304. The secondary caul plates 302 may be formed of a thin material (e.g., approximately 0.5 mm to 1.5 mm in thickness), such as carbon fiber or other suitable material capable of repeat use in an autoclave curing process. The secondary caul plates 302 may substantially cover radii 304 of the mandrel 216 but may not cover all of the radii. The secondary caul plates 302 may have substantially a same length as the mandrel 216. In some embodiments, a single caul plate may be used in place of the secondary caul plates 302.

The jig assembly 300 shown in FIG. 3A further includes shims 306(1)-(3) located in gaps formed between the caul plate 220 and the secondary caul plates 302. For example, a first shim 306(1) may be located between the caul plate 220 and a first one of the secondary caul plates 302 while a second shim 306(2) may be located between the caul plate 220 and a second one of the secondary caul plates 302. A third shim 306(3) may be located between the first one of the secondary caul plates 302 and the second one of the secondary caul plates 302. More or fewer shims may be used in the jig assembly 300. The shims 306(1)-(3) may fill a gap between the caul plates to create a smooth surface on an uncured part 308 located between the shims and the mandrel 216 (also between the caul plates 220, 302 and the mandrel 216). The uncured part 308 may be formed of prepreg wrapped around the mandrel 216. The uncured part 308, after curing, may have a structure, finish, and shape similar to the carbon fiber part 100 shown in FIG. 1.

The jig assembly 300 shown in FIG. 3A further includes a vacuum bag 310. The vacuum bag 310 may create an airtight seal over a subassembly 312 that includes the caul plate 220, the secondary caul plates 302, the uncured part 308, the shims 306(1)-(3), the mandrel 216, and other layers (e.g., breathable layers of material used around the caul plates and/or shims, etc.). The vacuum bag 310 may include a one-way valve that enables extraction of air or gas from the vacuum bag during deflation and consolidation of the vacuum bag. When the vacuum bag is deflated and consolidated around the subassembly 312, the caul plate 220, the secondary caul plates 302, and the shims 306(1)-(3) may compress the uncured part 308 against the mandrel 216 and may apply substantially similar pressure to most surfaces of the uncured part 308. Meanwhile, the compression member 226 coupled to the jig base may create additional force against the caul plate 220 and the secondary caul plates 302 toward the mandrel 216 to compress the uncured part 308. This additional force may reduce or eliminate detectable warping or wrinkling on a surface of the uncured part 308, surface deformation, or other unintended and undesirable features in the surface of the uncured part 308. Without the compression member 226, the warping or wrinkles may be formed due to uneven pressure from the vacuum bag that imparts a lateral force about the uncured part 308 and results in wrinkles or other unintended deformation on or near the convex surface of the uncured part 308 that corresponds to the convex surface 218 of the mandrel 216 and the interior concave surface 222 of the caul plate 220.

The jig assembly 300 shown in FIG. 3A further includes coupling features 314. The coupling features 314 may include a threaded rod 316 that is coupled to the jig base 202 and extends through the aperture 234 (shown in FIG. 4) in the arm 232. The coupling features 314 may include a nut 318 that couples to the threaded rod 316. When the nut 318 is tightened toward the jig base, the nut 318 causes the compression member 226 to impart a force on the caul plate 220 to compress the uncured part 308 against the mandrel 216. The nut 318 may be a cap nut. In some embodiments, the threaded rod 316 may have a length such that tightening the cap nut to a fully tightened position where the cap limits further tightening causes an ideal force to be imparted on the uncured part 308, such as a force specified in a design. Each arm 232 may have a coupling device therethrough, such as the threaded rod 316 and corresponding nut 318 to provide an even distribution of the force against the uncured part.

Figure 3B:
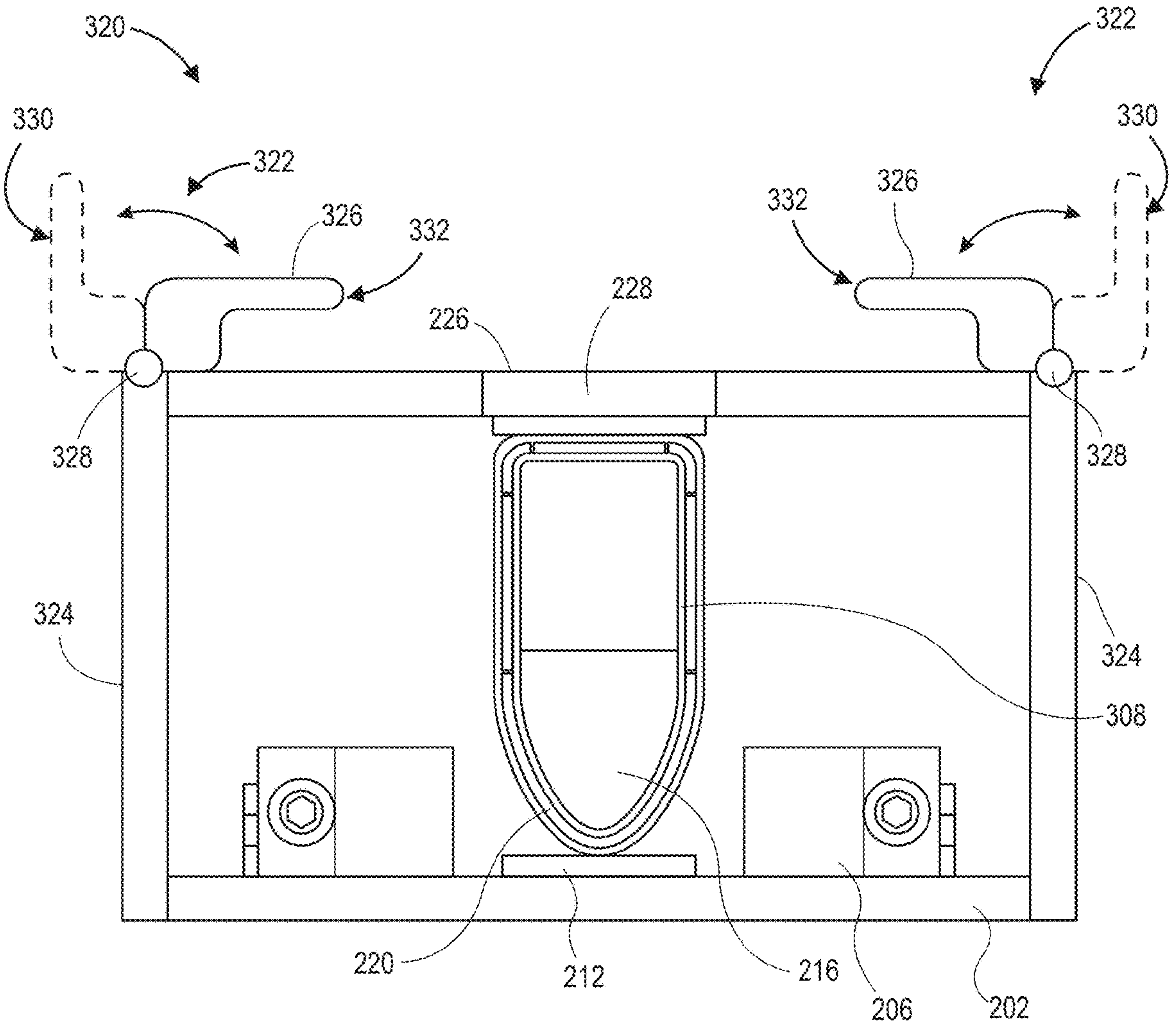
FIG. 3B is an end elevation view of an illustrative alternative jig assembly including levers to secure a compression member, according to an implementation.

FIG. 3B is an end elevation view of an illustrative alternative jig assembly 320. The alternative jig assembly 320 may include the same parts or similar parts as described above with reference to FIGS. 2A-2D and FIG. 3A, except the threaded rod 316 and the nut 318. The alternative jig assembly 320 may include lever coupling features 322. The lever coupling features 322 may include a support member 324 coupled to a lever 326 by an axel 328. The support member 324 may be coupled to the jig base. The lever coupling features 322 may be implemented in pairs to provide even pressure across the body 228 of the compression member 226. For example, four levers or other multiples of two may be used to secure the compression member 226 to the jig base 202.

The lever 326 may movably alternate between a first position 330 configured to release the compression member 226 from the jig base 202 and a second position 332 configured to constrain the compression member 226 to the jig base 202. The lever 326, when in the second position 332, imparts a force on the compression member 226 that is translated onto the caul plate 220 and ultimately the uncured part 308.

The lever 326 may have an external profile that causes displacement of the compression member 226 toward the jig base 202 when the lever is in the second position 332. In some embodiments, rotation of the lever from the first position 330 toward the second position 332 may add additional force toward the caul plate 220. In various embodiments, the lever 326 may be prevented from further rotation past the second position 332. When the lever 326 is at the second position 332, the lever 326 may cause an ideal force to be imparted on the uncured part 308, such as a force specified in a design.

Figure 3C:
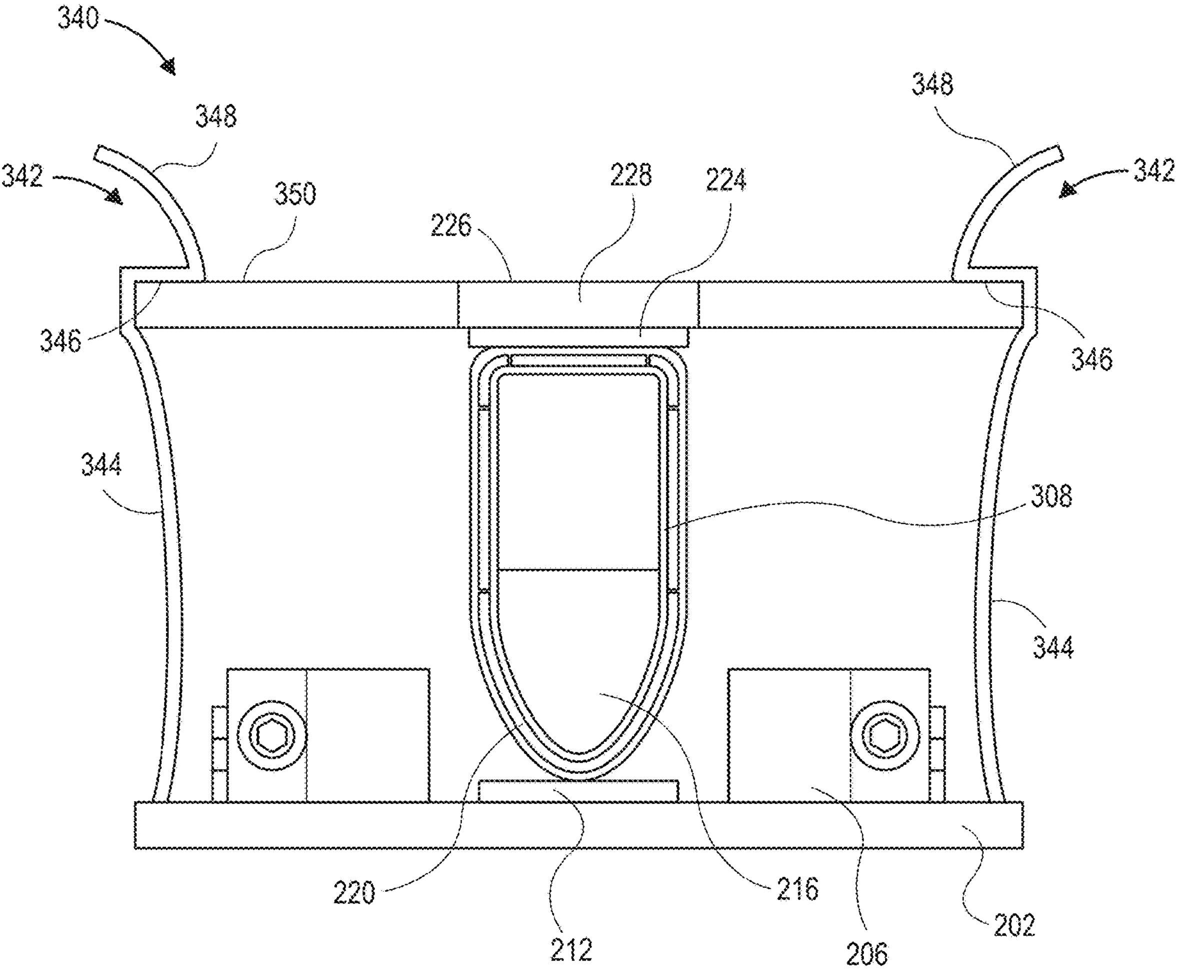
FIG. 3C is an end elevation view of another illustrative alternative jig assembly including biasing members to secure a compression member, according to an implementation.

FIG. 3C is an end elevation view of another illustrative alternative jig assembly 340. The alternative jig assembly 340 may include the same parts or similar parts as described above with reference to FIGS. 2A-2D and FIG. 3A, except the threaded rod 316 and the nut 318. The alternative jig assembly 340 may include biasing coupling features 342. The biasing coupling features 342 may include a biasing member 344 that includes or is coupled to a restraining feature 346 and a release tab 348. The compression member 226 is shown in FIG. 3C as coupled to the jig base 202 by the biasing coupling features 342 where an upper surface 350 of the compression member 226 is in contact with the restraining feature 346, thereby imparting a force on the compression member 226 toward the jig base 202, and thereby causing a force on the caul plate 220 that is translated to compress the uncured part 308 into the mandrel 216.

To couple the compression member 226 to the jig base 202, the compression member 226 may be pushed toward the jig base 202, causing deflection of the biasing member 344 outward and away from the mandrel (e.g., a center longitudinal axis of the jig base 202). The deflection of the biasing member 344 allows the compression member to slide into place and be forcibly seated against the mandrel and constrained by the restraining feature 346.

To remove the compression member 226 from the jig base 202, such as after a curing process is performed in an autoclave, the release tab 348 may be moved away from the mandrel (e.g., a center longitudinal axis of the jig base 202) causing deflection of the biasing member 344 and disengagement of the restraining member 346 from the upper surface 350 of the compression member 226, thereby uncoupling the compression member 226 from the jig base 202.

In some embodiments, the alternative jig assembly 340 may include the shafts 316 that extend through the apertures 234 to align the compression member 226 with the jig base 202 (not shown in FIG. 3C).

Figure 4:
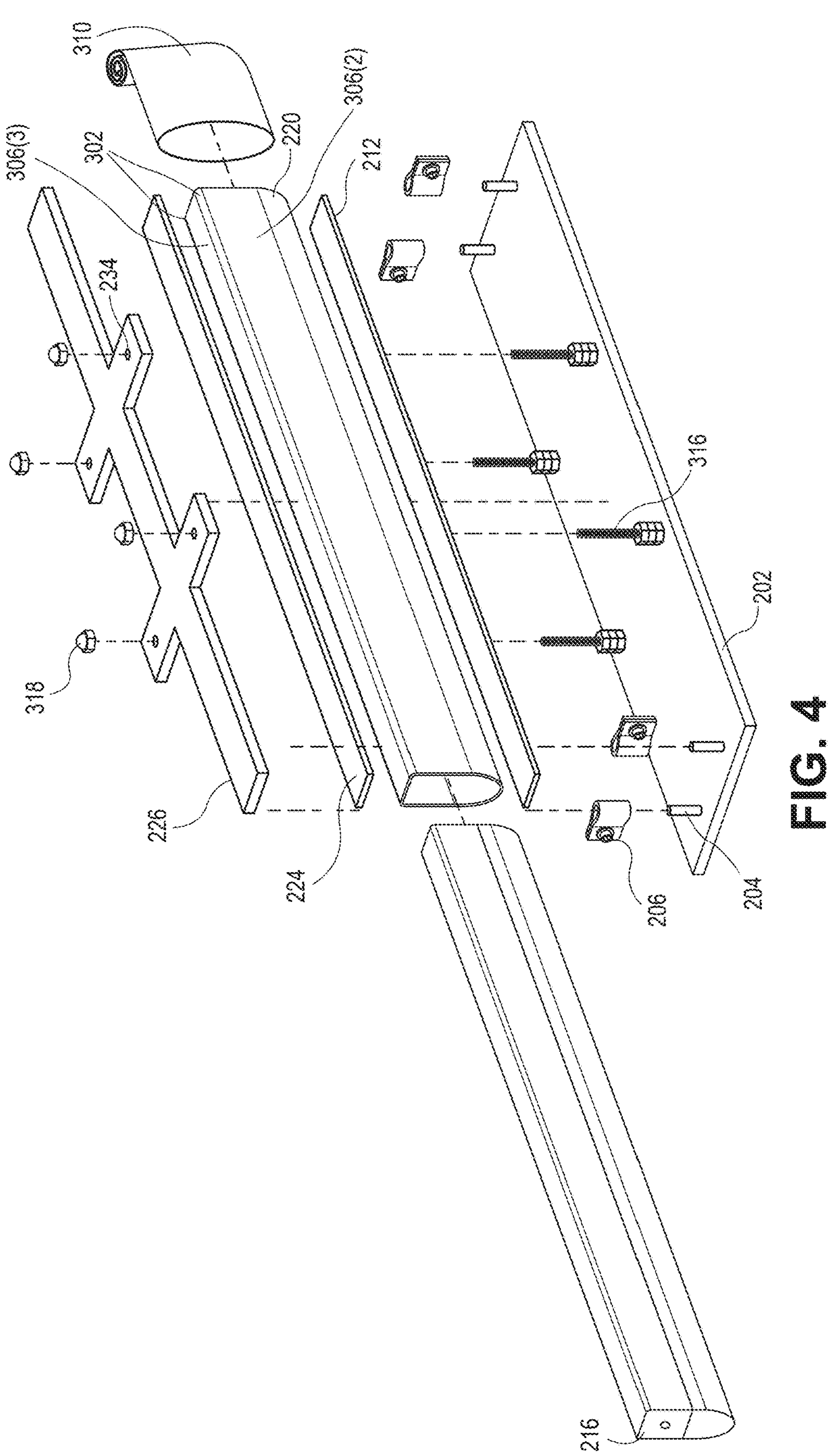
FIG. 4 is an exploded perspective view of the jig assembly shown in FIG. 3A, according to an implementation.

FIG. 4 is an exploded perspective view of the jig assembly 300 shown in FIG. 3A, according to an implementation. The alternative jig assembly 320 and 340 may be substantially similar to the jig assembly 300 except for the coupling features that couple the compression member 226 to the jig base 202.

To assembly the jig assembly 300, the jig base 202 may be selected. The guideposts 204 may be coupled to the jig base 202. The guideposts 204 may be outfitted with the insulators 206. The first pad 212 may be coupled to the jig base 202 between the guideposts. In some embodiments, the first pad 212 may be adhered to the jig base 202 using an adhesive.

The mandrel 216 may be wrapped in fiber, such as prepreg. The caul plate 220, the secondary caul plates 302, and the shims 306(1)-(3) may be coupled to or placed about the uncured part to form a substantially continuous outer layer around the uncured part. The mandrel 216, the caul plate 220, the secondary caul plates 302, the shims 306(1)-(3), and the uncured part may be inserted into the vacuum bag 310 to form the subassembly 312 (shown in FIG. 3A). The subassembly may be positioned against the first pad 212 and between pairs of the guideposts 204. The second pad 224 may be positioned over the top of the mandrel on a second side opposite a first side of the mandrel 216 that touches the first pad 212. The compression member 226 may be coupled to the jig base 202 over the second pad 224 and coupled via the nuts 318 and corresponding threaded rod 316 (or other coupling features described in FIGS. 3B and 3C).

In some embodiments, the exploded view shown in FIG. 4 includes the following components. The mandrel 216 may be configured to receive prepreg wrapped around the mandrel to form a hollow part having a convex surface extending longitudinally along the hollow part. The caul plate 220 may include a substantially similar profile as the convex surface. The caul plate 220 may be configured to be removably coupled to the convex surface formed by the prepreg wrapped around the mandrel 216. The vacuum bag 310 may enclose at least the mandrel 216 and the caul plate 220. The jig base 202 may receive the mandrel 216 in the vacuum bag. The first pad 212 may extend at least a length of the caul plate 220 and be located between the caul plate and the jig base 202. The compression member 226 may be coupled to the jig base 202 to apply a force against the caul plate 220 and toward the mandrel 216. The compression member 226 may include a substantially rectangular-shaped body with a substantially flat surface facing the mandrel 216. Other components may be optionally added to the jig assembly based on design considerations, geometry of a part to be cured, and so forth.

Figure 5:
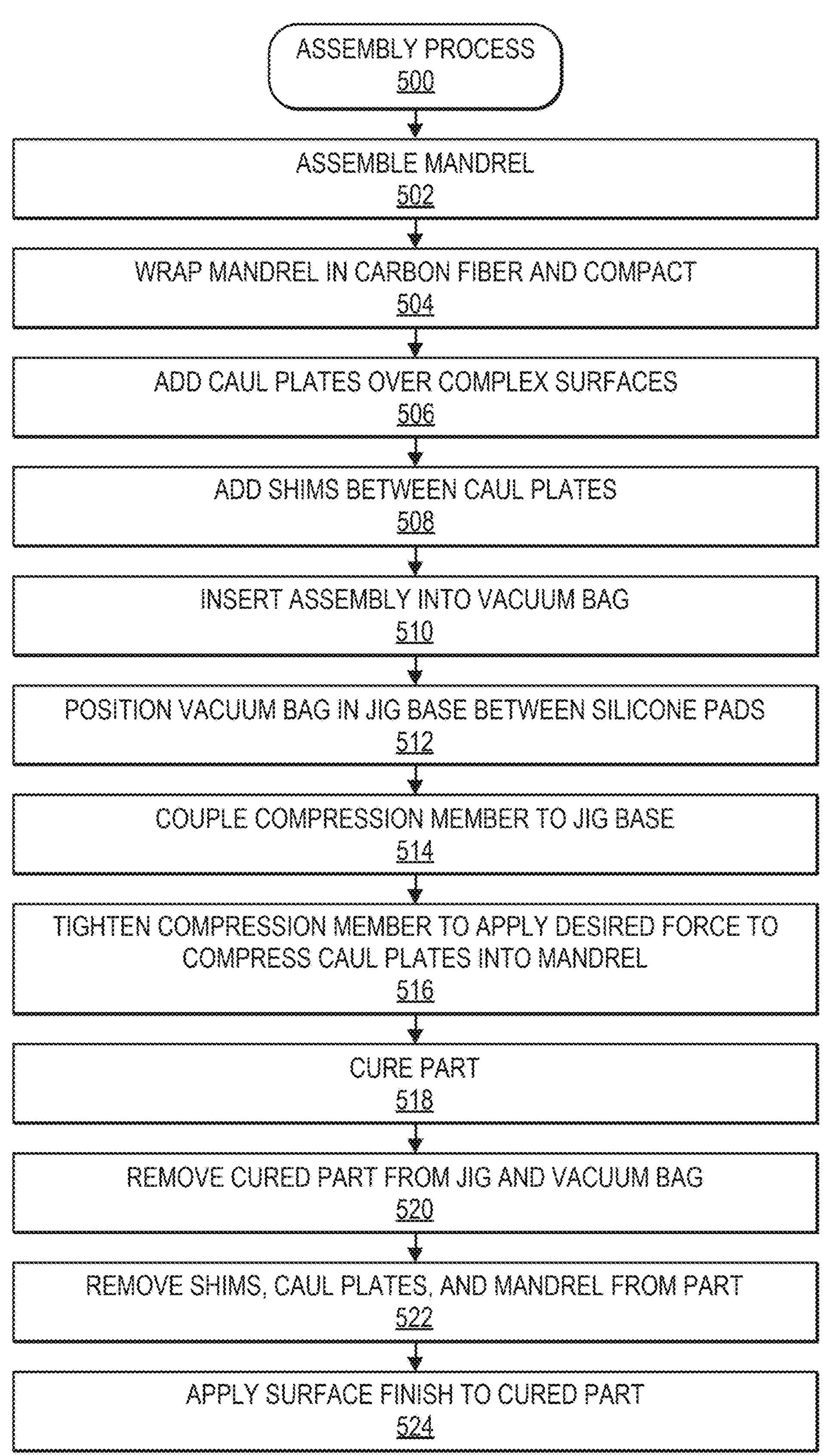
FIG. 5 is a flow diagram of an example process to create a hollow carbon fiber part using the illustrative jig assembly, according to an implementation.

FIG. 5 is a flow diagram of an example process 500 to create a hollow carbon fiber part using the illustrative jig assembly, according to an implementation. The order in which the operations are described is not intended to be construed as a limitation and any number of the described operations can be combined in any order and/or in parallel to implement the process. Likewise, one or more of the operations may be considered optional. Various operations from different processes may be combined in accordance with various embodiments.

The process 500 may begin by assembling the mandrel 216, as in 502. For example, the mandrel 216 may include the top section 216(1) and the bottom section 216(2), which may be coupled together, such as with the threaded bolt 217 that couples to threads in at least one of the parts of the mandrel 216.

The mandrel 216 may be wrapped in fiber, as in 504. The fiber, such as prepreg, may be used to form an uncured part around the mandrel in preparation for curing in an autoclave. In some embodiments, the uncured part may be formed around the mandrel 216 using other techniques, such as a wet lay-up technique. In some embodiments, multiple layers of fiber may be applied over the mandrel 216, possibly with compaction processes implemented therebetween.

The caul plate 220 and/or the caul plates 302 may be positioned over the uncured part, as in 506. The caul plates may be positioned over the uncured part in alignment with corresponding features shared between certain caul plates and surface on the mandrel (e.g., convex surfaces to corresponding concave surfaces, etc.). The caul plates may be positioned over a material positioned between the uncured part and the caul plate, such as a peel-ply material.

The shims 306(1)-(3) may be positioned over the uncured part adjacent and between the caul plates, as in 508. When only a single caul plate is used, any shims may be positioned adjacent to the caul plate. The shims may be positioned over an insulating material positioned between the uncured part and the shim.

The mandrel 216, uncured part, caul plate(s), and shims may form an assembly that is inserted into the vacuum bag 310, as in 510. The vacuum bag may be deflated and consolidated to create a force to compress the uncured part against the mandrel by imparting a force against the caul plate(s) and the shims.

The vacuum bag 310 including the assembly 312 may be positioned in the jig base 202, as in 512. The vacuum bag 310 may be in contact with the first pad 212, which may be coupled to the jig base between the guideposts. The assembly 312 may be oriented such that the convex surface of the mandrel may face toward the first pad 212. However, the assembly may be oriented such that the convex surface of the mandrel may face away from the first pad (and toward the compression member once coupled to the jig base).

The compression member 226 may be coupled to the jig base 202, as in 514. Prior to coupling the compression member to the jig base, the second pad 224 may be coupled to the compression member 226 or to the vacuum bag 310 to situate the second pad 224 between the mandrel 216 and the compression member 226 when the compression member is coupled to the jig base 202. The compression member 226 may be coupled using any of the coupling features described herein, including the coupling features described with reference to FIGS. 3A, 3B, and 3C.

The coupling features may be tightened, as in 516, to cause the compression member to generate a force against the caul plate which is translated into the uncured part and against the mandrel. For example, the coupling features may be tightened by turning a lever (as shown in FIG. 3B), threading a nut about a threaded rod (as shown in FIG. 3A), or moving the compression member toward the jig base 202 and through biasing members until restraining features secure the compression member 226 in place (as shown in FIG. 3C).

The uncured part, situated between the jig base 202 and the compression member 226, may be cured in an autoclave, as in 518. After curing, the cured part, the jig base, and the compression member may be removed from the autoclave.

The cured part may be removed from the jig base 202 by removing the compression member 226, and then removing the vacuum bag 310, as in 520.

The caul plate(s) and shims may be removed, the mandrel 216 may be unassembled and removed from the part, and any other materials may be discarded, as in 522.

Surface finishes and/or treatments may be applied to the cured part, as in 524. For example, a peel-ply layer may be removed from the cured part. In some embodiments, surface finishing may remove excess material, such as by applying a fine grit (e.g., 400 grid, etc.) sandpaper to the surface of the cured part. In various embodiments, a protective surface treatment (e.g., a surface finish spray, etc.) may be applied to the cured part.

In some embodiments, a curing process may include at least some of the following actions. A plurality of layers of carbon fiber prepreg may be applied over a mandrel to form a part. The part may include a convex surface. A caul plate may be coupled to substantially cover the convex surface. The carbon fiber prepreg may be situated between the caul plate and the mandrel. A layup assembly may be formed by inserting the caul plate, the carbon fiber prepreg, and the mandrel into a vacuum bag. The layup assembly may be positioned on a jig base such that the convex surface is oriented to face toward the jig base or face away from the jig base. A compression member may be coupled to the jig base to at least partially enclose the layup assembly between the jig base and the compression member. A force may be applied to the compression member to create a force against the convex surface of the carbon fiber prepreg and toward the mandrel. The layup assembly and the jig base with the compression member may be inserted into an autoclave. The carbon fiber prepreg may be cured in the autoclave.

In various embodiments, further actions may include one or more of the following possible actions. Shims may be coupled to substantially cover the surface of the carbon fiber prepreg proximate to the caul plate. A first silicon pad may be coupled to and over at least a portion of the jig base prior to the positioning of the layup assembly on the jig base. A second silicone pad may be coupled to or inserted over at least a portion of the layup assembly and facing the compression member prior to coupling the compression member to the jig base. Nuts may be tightened to bolts that extend from the jig base through the compression member. Levers may be actuated or rotated about an axis to secure the compression member to the jig base. A compression member may be inserted in a first direction toward the jig base into a biased member that includes a groove to restrain the compression member from moving away from the jig base in a second direction that is substantially opposite of the first direction.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Moreover, it should be apparent to one skilled in the art that the disclosure may be practiced without some or all of the specific details and steps disclosed herein.

Moreover, with respect to the one or more methods or processes of the present disclosure shown or described herein, including but not limited to the flow chart shown in FIG. 5, orders in which such methods or processes are presented are not intended to be construed as any limitation on the claimed inventions, and any number of the method or process steps or boxes described herein can be combined in any order, in parallel, and/or be omitted to implement the methods or processes described herein. Also, the drawings herein are not drawn to scale.

Disjunctive language such as the phrase "at least one of X, Y, or Z," or "at least one of X, Y and Z," unless specifically stated otherwise, is otherwise understood with the context as used in general to present that an item, term, etc., may be any of X, Y, or Z, or any combination thereof (e.g., X, Y, and/or Z). Thus, such disjunctive language is not generally intended to, and should not, imply that certain implementations require at least one of X, at least one of Y, or at least one of Z to each be present.

Unless otherwise explicitly stated, articles such as "a" or "an" should generally be interpreted to include one or more described items. Accordingly, phrases such as "a device configured to" or "a device operable to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Language of degree used herein, such as the terms "about," "approximately," "generally," "nearly," or "substantially" as used herein, represent a value, amount, or characteristic close to the stated value, amount, or characteristic that still performs a desired function or achieves a desired result. For example, the terms "about," "approximately," "generally," "nearly" or "substantially" may refer to an amount that is within less than 10% of, within less than 5% of, within less than 1% of, within less than 0.1% of, and within less than 0.01% of the stated amount.

Conditional language, such as, among others, "can," "could," "might," or "may," unless specifically stated otherwise, or otherwise understood within the context as used, is generally intended to convey in a permissive manner that certain implementations could include, or have the potential to include, but do not mandate or require, certain features, elements and/or steps. In a similar manner, terms such as "include," "including" and "includes" are generally intended to mean "including, but not limited to." Thus, such conditional language is not generally intended to imply that features, elements and/or steps are in any way required for one or more implementations or that one or more implementations necessarily include logic for deciding, with or without user input or prompting, whether these features, elements and/or steps are included or are to be performed in any particular implementation.

Although the invention has been described and illustrated with respect to illustrative implementations thereof, the foregoing and various other additions and omissions may be made therein and thereto without departing from the spirit and scope of the present disclosure.

What is claimed is:

1. An apparatus, comprising:

a mandrel configured to receive prepreg wrapped around the mandrel to form a part, the mandrel having a first surface with a curved surface feature;

a caul plate including a profile that is substantially similar to at least a portion of the first surface, the caul plate configured to be removably coupled over the prepreg proximate to the first surface;

a jig base to securely receive at least the mandrel and caul plate;

a compression member coupled to the jig base to contain the caul plate and the mandrel therebetween and to apply a force against the caul plate and toward the mandrel; and a pair of biasing members that include a restraining feature to securely couple the compression member in a secure position, the pair of biasing members configured to deflect away from one another during insertion of the compression member toward the jig base until a surface of the compression member aligns with the restraining feature of the pair of biasing members at the secure position thereby restraining the compression member in the secure position with the restraining feature.

2. The apparatus of claim 1, wherein the caul plate is a first caul plate removably coupled over the prepreg at a first location and proximate to a leading edge of the mandrel having the curved surface feature, and further comprising:

a second caul plate configured to be removably coupled over the prepreg at a second location that is different than the first location; and a shim having a thickness and profile to substantially fill a gap formed between the first caul plate positioned at the first location and the second caul plate positioned at the second location, the shim positioned over the prepreg in the gap.

3. The apparatus of claim 1, wherein:

the jig base includes a concave feature that is substantially similar to the curved surface feature of the mandrel, the concave feature to align with the curved surface feature when the mandrel is secured in the jig base by the compression member.

4. The apparatus of claim 1, further comprising:

a lever coupled to the jig base, the lever to movably alternate between a first position configured to uncouple the compression member and a second position configured to couple the compression member to the jig base, wherein the lever when in the second position imparts the force on the caul plate.

5. The apparatus of claim 1, wherein the compression member further includes a body and coupling arms that extend laterally from the body, each coupling arm including an aperture, and further comprising:

a threaded rod coupled to the jig base for each of the coupling arms, the threaded rod extending from the jig base through the aperture in the coupling arm; and a cap nut to couple the compression member to the threaded rod.

6. The apparatus of claim 1, further comprising:

a vacuum bag to enclose at least the mandrel and the caul plate.

7. An apparatus, comprising:

a mandrel configured to receive prepreg wrapped around the mandrel to form a part, the mandrel having a first surface with a curved surface feature;

a caul plate including a profile that is substantially similar to at least a portion of the first surface, the caul plate configured to be removably coupled over the prepreg proximate to the first surface;

a vacuum bag to enclose at least the mandrel and the caul plate;

a jig base to securely receive at least the mandrel and caul plate;

a compression member coupled to the jig base to contain the caul plate and the mandrel therebetween and to apply a force against the caul plate and toward the mandrel; and a pair of biasing members that include a restraining feature to securely couple the compression member in a secure position, the pair of biasing members configured to deflect away from one another during insertion of the compression member toward the jig base until a surface of the compression member aligns with the restraining feature of the pair of biasing members at the secure position thereby restraining the compression member in the secure position with the restraining feature.

8. The apparatus of claim 7, wherein the caul plate is a first caul plate removably coupled over the prepreg at a first location and proximate to a leading edge of the mandrel having the curved surface feature, and further comprising:

a second caul plate configured to be removably coupled over the prepreg at a second location that is different than the first location; and a shim having a thickness and profile to substantially fill a gap formed between the first caul plate positioned at the first location and the second caul plate positioned at the second location, the shim positioned over the prepreg in the gap.

9. The apparatus of claim 7, wherein:

the jig base includes a concave feature that is substantially similar to the curved surface feature of the mandrel, the concave feature to align with the curved surface feature when the mandrel is secured in the jig base by the compression member.

10. The apparatus of claim 7, further comprising:

a lever coupled to the jig base, the lever to movably alternate between a first position configured to uncouple the compression member and a second position configured to couple the compression member to the jig base, wherein the lever when in the second position imparts the force on the caul plate.

11. The apparatus of claim 7, wherein the compression member further includes a body and coupling arms that extend laterally from the body, each coupling arm including an aperture, and further comprising:

a threaded rod coupled to the jig base for each of the coupling arms, the threaded rod extending from the jig base through the aperture in the coupling arm; and a cap nut to couple the compression member to the threaded rod.

12. The apparatus of claim 1, further comprising:

a first silicon pad coupled to a first side of the jig base and extending at least a length of the caul plate, wherein the mandrel is positioned in the jig base to orient the curved surface feature toward the first silicon pad.

13. The apparatus of claim 1, further comprising:

a second silicon pad extending at least a length of the mandrel and located between the mandrel and the compression member.

14. The apparatus of claim 7, further comprising:

a first silicon pad coupled to a first side of the jig base and extending at least a length of the caul plate, wherein the mandrel is positioned in the jig base to orient the curved surface feature toward the first silicon pad.

15. The apparatus of claim 7, further comprising:

a second silicon pad extending at least a length of the mandrel and located between the mandrel and the compression member.

16. An apparatus, comprising:

a mandrel configured to receive prepreg wrapped around the mandrel to form a part, the mandrel having a first surface with a curved surface feature;

a caul plate including a profile that is substantially similar to at least a portion of the first surface, the caul plate configured to be removably coupled over the prepreg proximate to the first surface;

at least one shim configured to be removably coupled adjacent to the caul plate, the at least one shim having a first side adjacent to the caul plate where the first side has a first thickness that is substantially similar to a second thickness of the caul plate;

a jig base to securely receive at least the mandrel and caul plate;

a compression member coupled to the jig base to contain the caul plate and the mandrel therebetween and to apply a force against the caul plate and toward the mandrel; and at least one biasing member that includes a restraining feature to securely couple the compression member in a secure position, the at least one biasing member configured to deflect during insertion of the compression member toward the jig base until a surface of the compression member aligns with the restraining feature of the at least one biasing member at the secure position thereby restraining the compression member in the secure position with the restraining feature.

17. The apparatus of claim 16, wherein the caul plate is a first caul plate removably coupled over the prepreg at a first location and proximate to a leading edge of the mandrel having the curved surface feature, and further comprising:

a second caul plate configured to be removably coupled over the prepreg at a second location that is different than the first location; and a shim having a thickness and profile to substantially fill a gap formed between the first caul plate positioned at the first location and the second caul plate positioned at the second location, the shim positioned over the prepreg in the gap.

18. The apparatus of claim 16, wherein:

the jig base includes a concave feature that is substantially similar to the curved surface feature of the mandrel, the concave feature to align with the curved surface feature when the mandrel is secured in the jig base by the compression member.

19. The apparatus of claim 16, further comprising:

a vacuum bag to enclose at least the mandrel and the caul plate.

20. The apparatus of claim 16, further comprising:

a first silicon pad coupled to a first side of the jig base and extending at least a length of the caul plate, wherein the mandrel is positioned in the jig base to orient the curved surface feature toward the first silicon pad.

* * * * *